May 22, 1951     I. S. EGGLESTON     2,553,964
DRIVING ATTACHMENT FOR ROLLER CONVEYERS
Filed Feb. 5, 1947     2 Sheets-Sheet 1
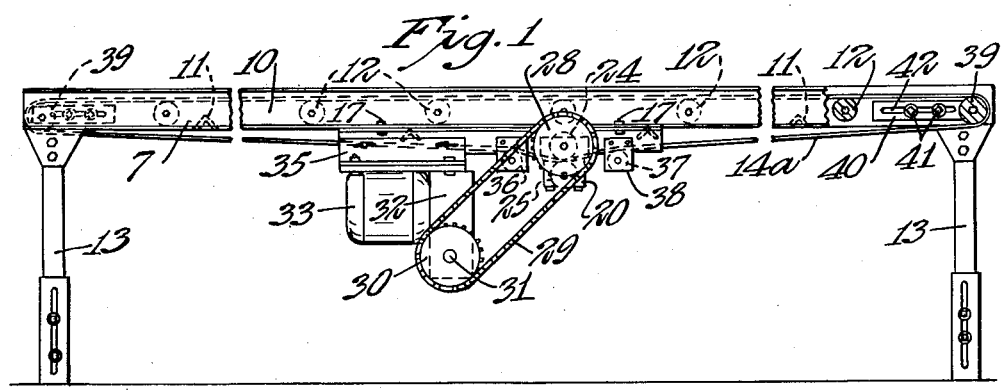
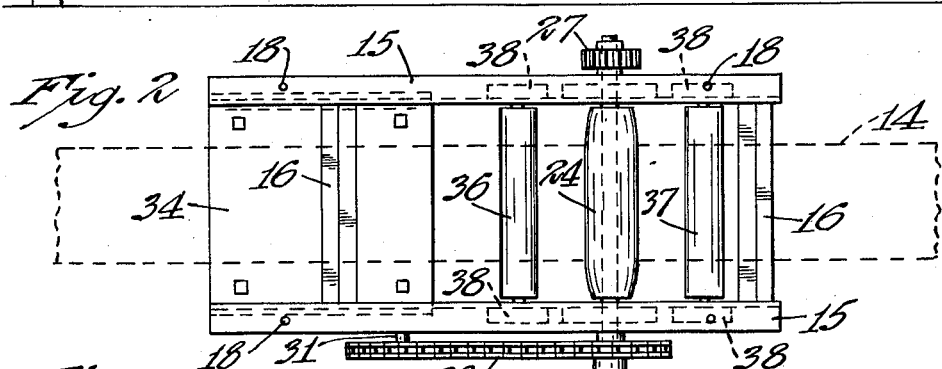
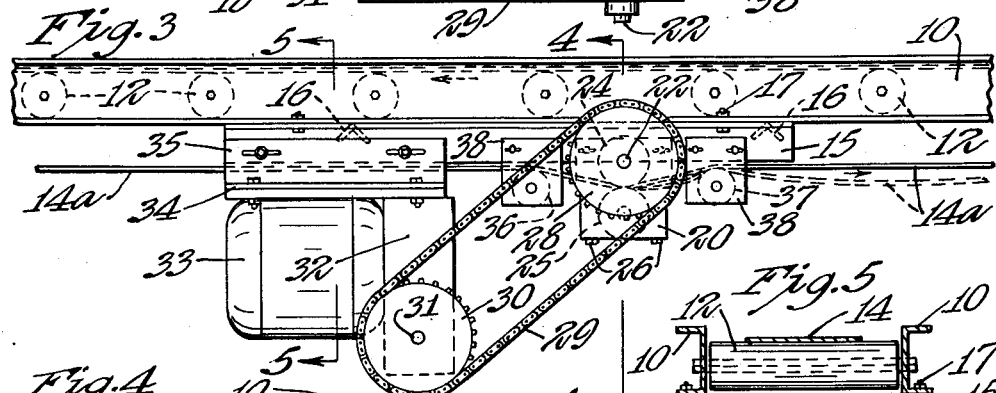
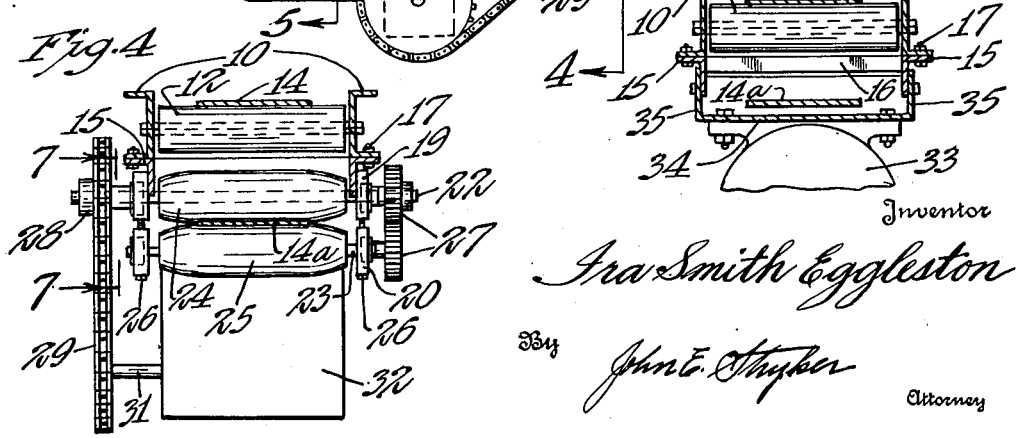
Inventor
Ira Smith Eggleston
By John E. Stryker
Attorney May 22, 1951  I. S. EGGLESTON  2,553,964
DRIVING ATTACHMENT FOR ROLLER CONVEYERS
Filed Feb. 5, 1947  2 Sheets-Sheet 2
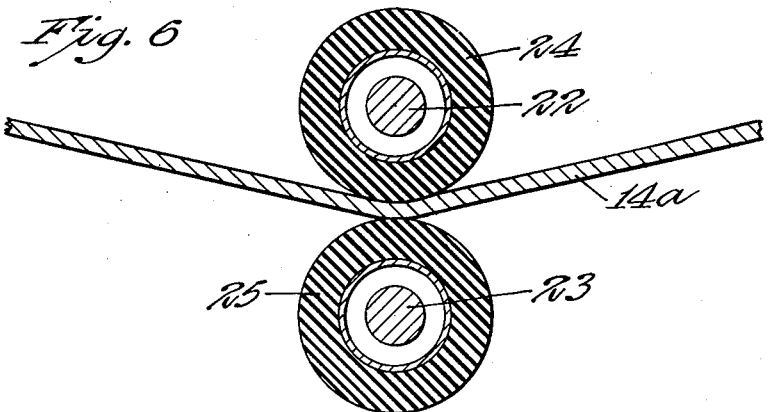
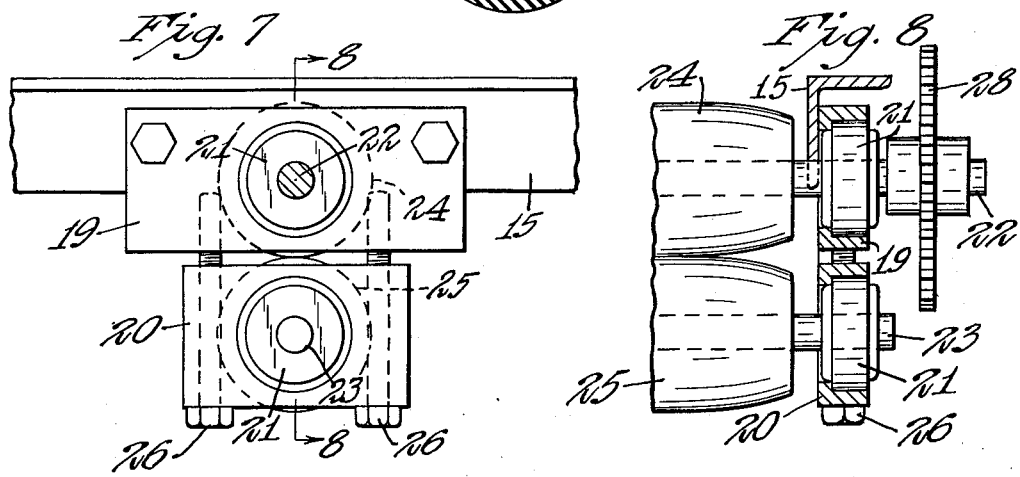
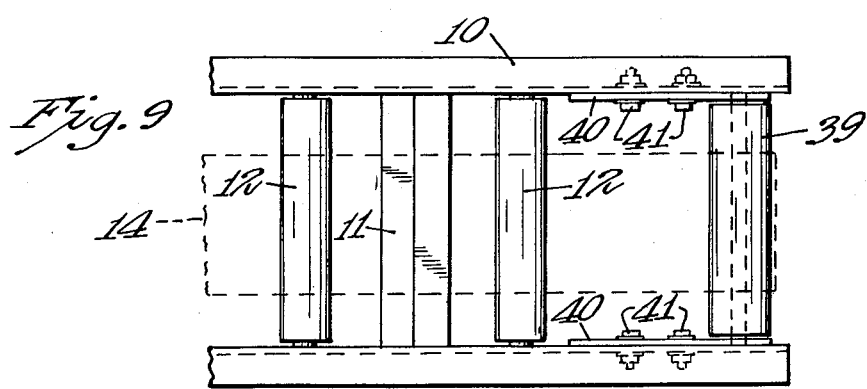
Inventor
Ira Smith Eggleston
By John E. Stryker
Attorney Patented May 22, 1951

2,553,964

UNITED STATES PATENT OFFICE 2,553,964

DRIVING ATTACHMENT FOR ROLLER CONVEYERS

Ira Smith Eggleston, St. Paul, Minn., assignor to Standard Conveyor Company, North St. Paul, Minn., a corporation of Minnesota Application February 5, 1947, Serial No. 726,666

3 Claims. (Cl. 198—203)

1

This invention relates to driving attachments for roller conveyors and particularly to means for converting ordinary or conventional gravity conveyors into power driven belt conveyors whereby load units may be moved at controlled speeds, either up or down relatively steep inclines.

It is an object of my invention to provide driving mechanism of this class which is inexpensive, efficient and easy to install on ordinary roller conveyors.

Another object is to provide motor driven mechanism of this class whereby a load carrying belt may be driven in either forward or reverse direction with equal convenience and efficiency.

A further object is to provide a driving attachment which is operative to drive an endless conveyor belt by engagement with a slack lower or return reach thereof, thereby making it unnecessary to retain the belt under tension, reducing wear, prolonging the life of the belt and minimizing adjustments of the tension to compensate for stretching and shrinking of the belt.

A particular object is to provide means for converting an ordinary gravity roller conveyor having a frame including side rails and rollers between the side rails into a driven belt conveyor, comprising an auxiliary frame adapted to be attached to the frame of the roller conveyor, a pair of belt driving rollers arranged one above the other and carried by the auxiliary frame, an endless conveyor belt having its upper reach adapted to overlie and be supported by the rollers of the gravity conveyor and having its lower reach passing between and in the grip of the belt driving rollers and a motor carried by the auxiliary frame and operatively connected to at least one of the belt driving rollers.

Other objects will appear and be more fully pointed out in the following specification and claims.

Referring to the accompanying drawings which illustrate by way of example, and not for the purpose of limitation, a preferred embodiment of my invention:

Figure 1 is a side elevational view showing my attachment in operative relation to a gravity roller conveyor of common type, a portion of one of the side rails being broken away to show one of the belt tensioning rollers and the support therefor;

Fig. 2 is a plan view of the attachment frame and driving mechanism carried thereby;

Fig. 3 is a side-elevational view of the driving

2 mechanism, frame and a fragmentary portion of the roller conveyor on which the attachment frame is mounted;

Figs. 4 and 5 are fragmentary sections taken respectively on the lines 4—4 and 5—5 of Fig. 3;

Fig. 6 is a cross section through the belt drive rollers and showing a portion of the belt in longitudinal section;

Fig. 7 is a side elevational view showing details of a pair of the bearing supports for the belt driving rollers;

Fig. 8 is a fragmentary section taken on the line 8—8 of Fig. 7, and

Fig. 9 is a plan view showing an end portion of the roller conveyor including an end roller suitable for guiding the belt, together with the adjustable supports therefor.

My attachment is shown in connection with an ordinary roller conveyor having side rails 10 of channel shape in cross section rigidly connected together by cross members 11. Load supporting rollers 12 are mounted between the rails 10 on supporting shafts and anti-friction bearings. The rails 10 are supported at their ends and at a suitable elevation on legs 13 which are detachable from the rails and the lengths of which are adjustable so that the rails may be supported either in a horizontal position or at any desired slope or incline.

To convert such a roller conveyor into a power driven belt conveyor, I provide an endless belt indicated generally by the numeral 14 and driving means attachable as a unit to the rails 10. The upper reach of the belt 14 is adapted to be supported on the rollers 12 and the lower or return reach 14a is extended below the rollers 12 in engagement with the driving mechanism presently to be described. This mechanism is carried by an auxiliary frame comprising a pair of longitudinal members 15 rigidly connected in spaced parallel relation by cross members 16 and adapted to be bolted or otherwise secured to the bottom flanges of the rails 10. Bolts 17 extending through perforations 18 (Fig. 2) in the frame members 15 and through registering holes in the rails 10 afford a suitable fastening. Bearing blocks 19 and 20 are mounted on the frame members 15 to support anti-friction bearings 21 in which shafts 22 and 23 are journaled. These shafts have fixed thereon belt driving rollers 24 and 25 respectively between which the lower reach 14a of the belt is gripped.

As best shown in Figs. 7 and 8, each of the bearing blocks 19 is fastened to one of the frame members 15 by bolts and each of the blocks 20 is adjustable to and from the associated block 19, being connected thereto by cap screws 26 which extend through apertures in the block 20 with their threaded upper end portions fitting in elongated tapped holes in the block 19. By such means the lower roller 25 may be adjusted to and from the roller 24 to grip the belt between the peripheries of these rollers with any desired pressure. The belt driving rollers 24 and 25 have peripheries which are preferably formed from synthetic or natural rubber of somewhat compressible and elastic character adapted to insure the desired continuous gripping pressure on the belt 14. These rollers are crowned so that they taper slightly from their median cross plane toward each end and thereby tend to retain the belt in proper centered relation to the central longitudinal plane perpendicular to the axes of the rollers.

Spur gears 27 (Figs. 2 and 4) operatively connect the rollers 24 and 25 for rotation in unison, these gears being fixed on projecting ends of the shafts 22 and 23 respectively. The opposite end of the shaft 22 projects from the bearing block 19 and is provided with a driving sprocket wheel 28. A driven chain 29 is trained on the wheel 28 and on the sprocket wheel 30 fixed on a shaft 31. The latter shaft is driven from an electric motor 33 by suitable speed reducing gears in a housing 32. To support this motor and the housing 32, a plate 34 having upwardly projecting flanges 35 is fastened to the frame members 15 and the motor and housing are bolted to the bottom of the plate 34. The motor 33 is preferably of the reversible type under control of suitable electric switches so that the shaft 31 may be driven in either clockwise or counter-clockwise direction.

The lower reach 14a of the belt 14 passes between the flanges 35 of the plate 34 and is guided to and from the bight of the driving rollers 24 and 25 on the upper peripheries of guide rollers 36 and 37. Each of these rollers is supported on an axial shaft which has bearings in a pair of blocks 38 fastened to and depending from the frame members 15. The upper peripheries of the rollers 36 and 37 are disposed in a common plane and at an elevation slightly above that of the bight of the rollers 24 and 25 so that the reach 14a of the belt is properly guided to the lower periphery of the roller 24 irrespective of the direction of travel and tension of the belt. It will be evident that both of the driving rollers have substantially line contact with the belt. The small arc of contact between the belt and roller 24 is insufficient to affect the frictional driving force on the belt which is a function of the pressure exerted by the directly opposed peripheries of the rollers 24 and 25.

As best shown in Figs 1 and 9, guide rollers 39 for the belt 14 are mounted on opposite ends respectively of the rails 10. These guide rollers are preferably crowned sufficiently to center the belt and each is supported at its ends on a pair of slotted bars 40 fastened by bolts 41 to the respective inner faces of the rails. To adapt an ordinary roller conveyor to receive my attachment, it is desirable to replace at least one of the rollers 12 by a guide roller 39 for the belt. This may be accomplished quickly and easily by merely removing a roller 12 of the conventional roller conveyor and fastening a roller 39 in its place by bolting the supporting bars 40 to the side rails 10, as indicated. Two horizontally spaced bolts 41 pass through an elongated slot 42 in each of the bars 40 and through holes drilled in each rail 10 to permit adjustments of the roller 39 longitudinally of the rails 10.

To convert a roller conveyor into a power-driven belt conveyor it will now be evident that one or both of the end guide rollers 39 may be installed and then the driving mechanism may be attached merely by bolting the auxiliary frame members 15 to the rails 10. The lower belt reach 14a is threaded between the motor bracket 34 and roller conveyor frame and also between the drive rollers 24 and 25 and above the guide rollers 36 and 37, as shown. Before fastening the ends of the belts together, the upper reach is extended on the upper peripheries of the conveyor rollers 12 and around the peripheries of the guide rollers 39. The ends of the belt are finally fastened together in the usual or suitable manner. If necessary, the positions of the end rollers 39, or either of them, may be adjusted longitudinally of the rails by manipulating the bolts 41.

As hereinbefore pointed out, it is unnecessary to maintain the belt 14 under tension. When loads are to be carried on the upper reach of the belt 14, the motor 33 is operated in the desired direction and the belt 14 is thereby driven at the desired speed through the speed reducing gearing in the housing 32, shaft 31, sprocket wheels 30 and 28, chain 29 and shaft 22. The driving effect of the rollers 24 and 25 is equalized by the spur gears 27 operatively connecting the shafts which support these rollers. Such gears connecting the driving rollers are not necessary in all cases since both of the rollers 24 and 25 are always in rolling engagement with the belt. Any desired friction between the rollers 24 and 25 and belt may be obtained by suitable manipulation of the screws 26. During operation, the portion of the reach 14a extending from the bight of the driving rollers 24 and 25 to an end of the conveyor will sag or remain slack. For example, when the belt 14 is driven in the direction indicated by arrows in Fig. 3, the reach 14a will be slack to the right of the rollers 24 and 25, as indicated in dotted lines and when the direction of travel of the belt is reversed, the belt will be slack at the opposite side of the driving rollers. In all normal operation the belt is firmly gripped and driven by frictional engagement between the contacting peripheries of the rollers 24 and 25, these peripheries being sufficiently compressible and elastic to insure proper driving engagement with the belt. Since the belt is driven irrespective of its tension, adjustment of the tension is seldom necessary even after the belt has stretched or shrunk substantially.

My improved attachments are sold as relatively compact and inexpensive "packages" which may be installed quickly and easily by unskilled labor on roller conveyors of ordinary construction. The importance of the present invention will be appreciated when it is considered that in many commercial establishments where sectional gravity roller conveyor systems are used, there are times when belt conveyors are needed in place of individual gravity sections and the number and location of the belt conveyors must be changed from time to time, the belt conveyors being used either separately or in end to end continuation of gravity sections. In such situations, it is particularly economical and advantageous to convert individual gravity sections into power driven belt conveyors where required by means of the present invention since the cost of doing so is far less than the cost of substituting ordinary belt conveyors. It is also a simple matter to reconvert to a gravity section when the need for my belt conveyor no longer exists at a particular place in a conveyor system.

Having described my invention, what I claim as now and desire to protect by Letters Patent is:

1. Means for converting an ordinary roller conveyor having a frame including side rails and rollers between the said rails, into a driven belt conveyor, comprising: an auxiliary frame adapted to be attached to the frame of the roller conveyor; a pair of belt driving rollers carried by said auxiliary frame and adapted to be disposed at the lower side of said side rails; an endless conveyor belt having its upper reach adapted to overlie and to be supported by the rollers of the roller conveyor and having its lower reach passing between said belt driving rollers; belt guiding and supporting rollers for the lower reach of the belt carried by the auxiliary frame respectively at opposite sides of and adjacent to the belt driving rollers, said belt guiding rollers being disposed to direct said belt to and from the bight of the driving rollers at opposite sides thereof and at substantially equal angles to the plane defined by the axes of the driving rollers; means causing said belt driving rollers to grip said lower reach with a desired pressure to drive said belt irrespective of whether it is under tension; a motor carried by said auxiliary frame, and means drivingly interconnecting said motor with at least one of said belt driving rollers.

2. Means as defined in claim 1 in which a pair of supporting arms for a belt guide roller are attached to said side rails respectively near an end thereof and a crowned belt guide roller is carried by said arms in place of an end roller of the roller conveyor.

3. Means for converting an ordinary gravity roller conveyor having a frame including side rails and rollers between the said rails, into a driven belt conveyor, comprising: an auxiliary frame adapted to be attached to the frame of the roller conveyor; a pair of belt driving rollers carried by said auxiliary frame and adapted to be disposed at the lower side of said side rails; an endless conveyor belt having its upper reach adapted to overlie and to be supported by the rollers of the gravity conveyor and having its lower reach passing between said belt driving rollers; adjustable means causing said belt driving rollers to grip said lower reach with a desired pressure to drive said belt irrespective of whether it is under tension; a belt guide roller on either side of said belt driving rollers, said guide rollers being carried by said auxiliary frame and engaging said lower reach of said endless belt to guide the same to the bight of the driving rollers from opposite sides thereof at substantially equal angles to the plane defined by the axes of said belt driving rollers; a reversible motor carried by said auxiliary frame, and means drivingly interconnecting said motor with at least one of said belt driving rollers.

IRA SMITH EGGLESTON.

REFERENCES CITED

The following references are of record in the file of this patent:

UNITED STATES PATENTS

| Number | Name | Date |
|---|---|---|
| 173,332 | Parr | Feb. 8, 1876 |
| 780,145 | Vaughan | Jan. 17, 1905 |
| 1,762,772 | Fisher | June 10, 1930 |
| 1,817,348 | Claghorn | Aug. 4, 1931 |
| 1,922,699 | Jennings et al. | Aug. 15, 1933 |
| 2,165,759 | Nyborg | July 11, 1939 |
| 2,202,882 | Wylie | June 4, 1940 |
| 2,413,339 | Stadelman | Dec. 31, 1946 |